United States Patent
Lin

(10) Patent No.: US 7,203,783 B2
(45) Date of Patent: Apr. 10, 2007

(54) ELECTRICAL HOST SYSTEM WITH EXPANDABLE OPTICAL DISK RECORDING AND PLAYING DEVICE

(75) Inventor: Li-Cheng Lin, Shindian (TW)

(73) Assignee: VIA Technologies, Inc., Shindian, Taipei (TW)

( * ) Notice: Subject to any disclaimer, the term of this patent is extended or adjusted under 35 U.S.C. 154(b) by 173 days.

(21) Appl. No.: 10/999,981

(22) Filed: Dec. 1, 2004

(65) Prior Publication Data

US 2005/0249081 A1 Nov. 10, 2005

Related U.S. Application Data

(60) Provisional application No. 60/568,669, filed on May 7, 2004.

(51) Int. Cl.
*G06F 13/00* (2006.01)
*G06F 3/00* (2006.01)

(52) U.S. Cl. ............................ 710/300; 710/73; 710/74

(58) Field of Classification Search .................. 710/73, 710/74, 300
See application file for complete search history.

(56) References Cited

U.S. PATENT DOCUMENTS 6,128,263 A * 10/2000 Fujii et al. ............... 369/47.27

| | | | | |
|---|---|---|---|---|
| 2002/0046401 A1* | 4/2002 | Miyazaki et al. | ............. | 725/32 |
| 2003/0185301 A1* | 10/2003 | Abrams et al. | ........ | 375/240.12 |
| 2004/0049624 A1* | 3/2004 | Salmonsen | .................. | 710/306 |
| 2004/0204944 A1* | 10/2004 | Castillo | ...................... | 704/500 |
| 2005/0036765 A1* | 2/2005 | Nonaka et al. | ............... | 386/94 |

FOREIGN PATENT DOCUMENTS

JP         410177539 A * 6/1998

* cited by examiner

*Primary Examiner*—Glenn A. Auve
(74) *Attorney, Agent, or Firm*—Bacon & Thomas, PLLC

(57) ABSTRACT

An electrical host system includes a host and an expandable optical disk recording and playing device. The expandable optical disk recording and playing device includes an expanding interface module, an expanding interface, a storage interface module, an output interface module and a CODEC module. The expanding interface module connects to the expanding interface and the host. The storage interface module connects to a storage device. The CODEC module encodes, decodes or transcodes an audio/video source to generate audio/video data, wherein the audio/video source is inputted from the host through the expanding interface and the expanding interface module. The audio/video data are outputted through the output interface module, or through the storage interface module to the storage device.

13 Claims, 2 Drawing Sheets

ELECTRICAL HOST SYSTEM WITH EXPANDABLE OPTICAL DISK RECORDING AND PLAYING DEVICE

CROSS REFERENCE TO RELATED APPLICATIONS

This applicant claims the benefit of the filing data of provisional application No. 60/568,669 filed May 7, 2004, under 35 USC §119(e) (1).

BACKGROUND OF THE INVENTION

1. Field of Invention

The invention relates to an electrical host system and, in particular, to an electrical host system with an expandable optical disk recording and playing device.

2. Related Art

Regarding to the conventional electrical host, such as a computer, the powerful calculating functions are usually provided. The optical disk drive, which cooperates with the conventional electrical host, is only used for providing the simple data access function with limited capacity. That is because of the electrical host providing most calculating functions. The above-mentioned structure is one of the most common electrical host systems. For example, a desktop computer host system 1 as shown in FIG. 1 includes an optical disk drive 11.

In addition, many families have the demands of optical disk playing and optical disk recording, so that they usually purchase the conventional optical disk recording and playing device for playing optical disks and recording data in optical disks. As shown in FIG. 2, a conventional optical disk recording and playing device 2 includes an input interface 21, a CODEC module 22, a microprocessor 23, a memory module 24, a storage interface module 25, and an output interface 26. The input interface 21 is for receiving an audio/video (A/V) source 30. The microprocessor 23 and memory module 24 cooperate with the CODEC module 22 to encode, decode or transcode the A/V source 30 for generating A/V data. The storage interface module 25 connects to a storage device 41 such as a hard disk drive or a DVD writer. When the storage device 41 is a DVD writer, the storage interface module 25 is a conventional ATA interface. The output interface 26 outputs the encoded, decoded or transcoded A/V data, and may further connect to an output device 42 such as a monitor and a speaker. Thus, the monitor can display the outputted image, and the speaker can output the voice.

As mentioned above, if the user would like to record the A/V data into an optical disk, the host must be equipped with an optical disk recorder. Moreover, if the optical disk recording the A/V data is to be properly played in the conventional optical disk recording and playing device, the format of the A/V data must be transformed in advance, which occupies many system sources such as the memory and microprocessor. Furthermore, with regard to the trend toward e-homes, it is an objective to integrate the host and optical disk recording and playing device. Thus, the demands of customers about convenience and economy can be satisfied, whereas the conventional art is a poor solution of this problem.

SUMMARY OF THE INVENTION

In view of the foregoing, the invention is to provide an electrical host system with an expandable optical disk recording and playing device and a host, wherein the expandable optical disk recording and playing device and the host are connected by a PCI interface.

To achieve the above, an electrical host system of the invention includes a host and an expandable optical disk recording and playing device. The expandable optical disk recording and playing device comprises an expanding interface module, an expanding interface, a storage interface module, an output interface module, and a CODEC module. The expanding interface module may include a PCI bus and at least one slot, and the expanding interface connects to the slot. The expanding interface is further used for connecting to the host, and the storage interface module is used for connecting to a storage device. The CODEC module encodes, decodes or transcodes an A/V source to generate A/V data. The A/V source is inputted from the host through the expanding interface and the expanding interface module, and the audio/video data are outputted through the output interface module, or through the storage interface module to the storage device.

As mentioned above, since the electrical host system of the invention utilizes a PCI interface to connect the host and the expandable optical disk recording and playing device, the host and the expandable optical disk recording and playing device can properly connect to each other according to actual situations. Accordingly, the expandable optical disk recording and playing device can work independently, or can be controlled by the host by a way of, for example, a remote control. In other words, under a client-server model, the expandable optical disk recording and playing device is a client for receiving, recording, or playing the A/V data from the host. Thus, the processes of real-time recording, distributed processing and storing can be carried out.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
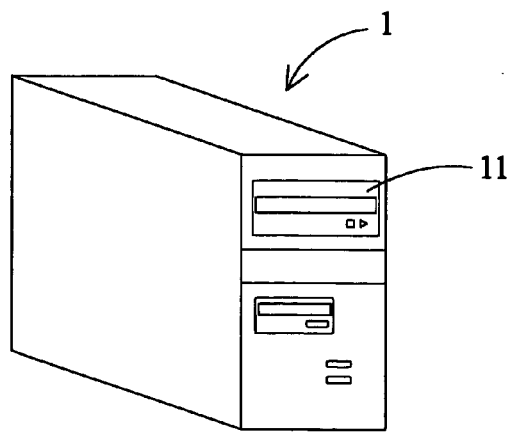
FIG. 1 is a schematic diagram showing a conventional computer host system.
Figure 2:
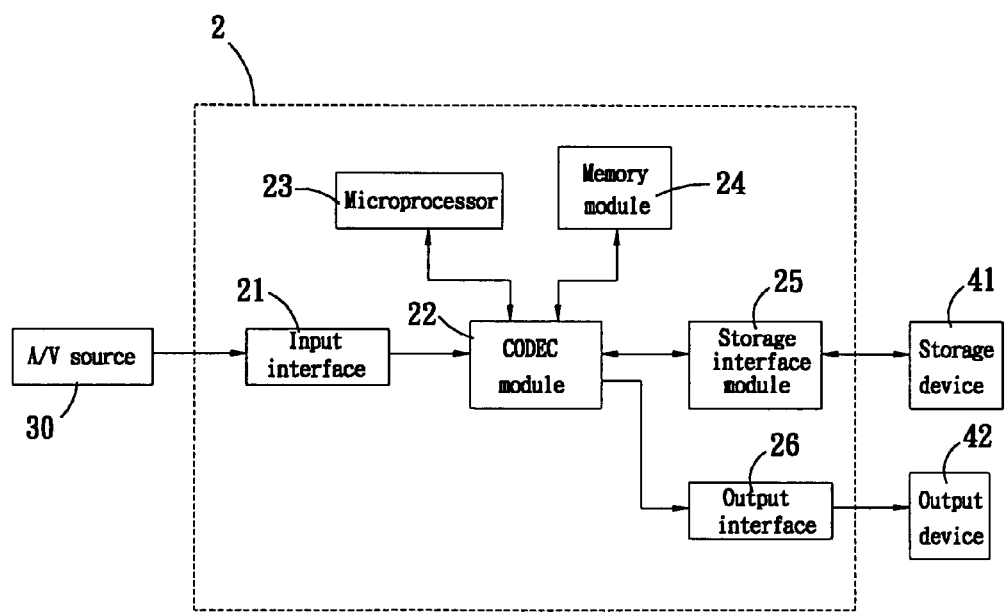
FIG. 2 is a schematic diagram showing a conventional optical disk recording and playing device.
Figure 3:
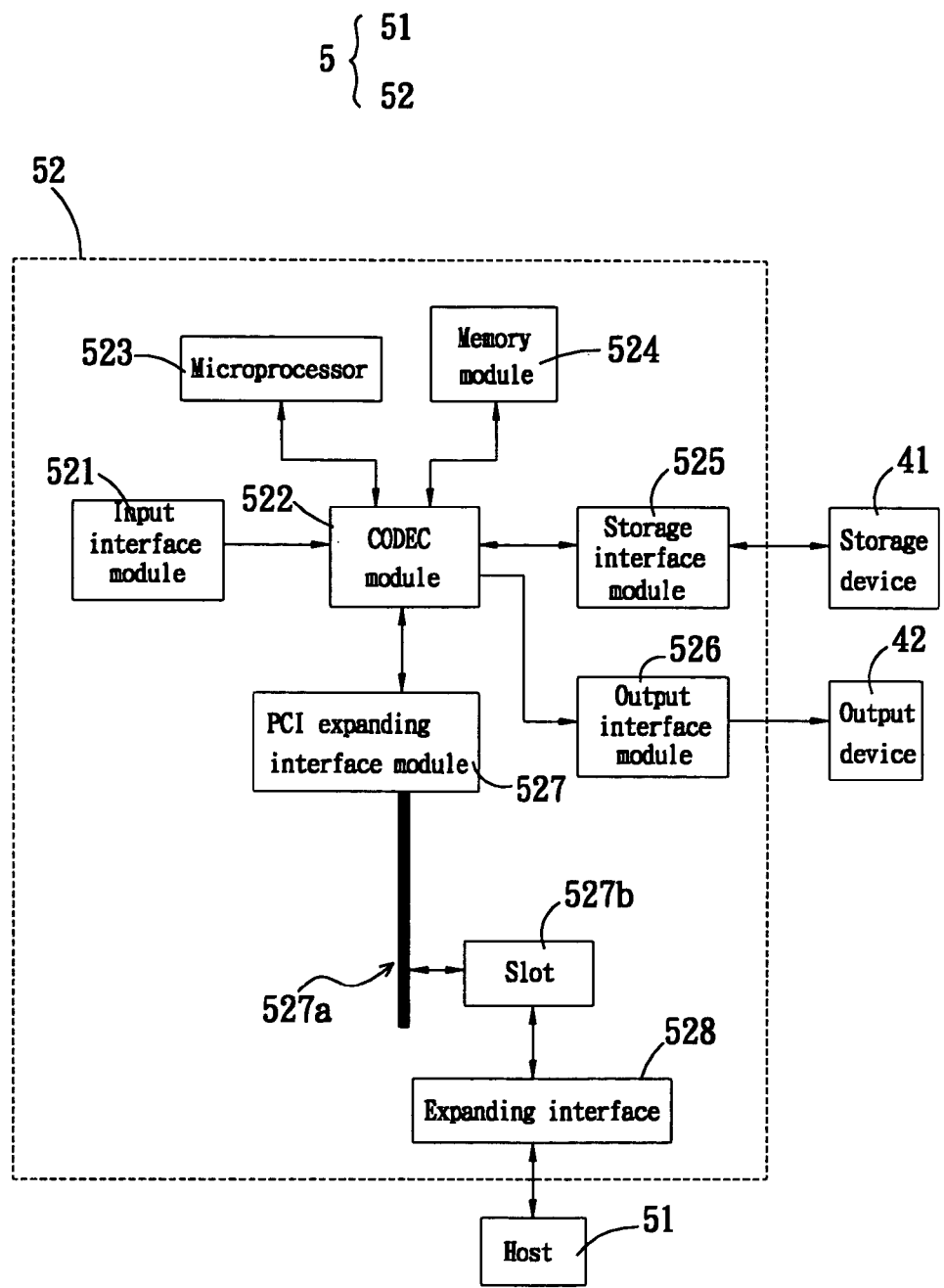
FIG. 3 is a schematic diagram showing an electrical host system with an expandable optical disk recording and playing device according to a preferred embodiment of the invention.

With reference to FIG. 3, an electrical host system 5 according to a preferred embodiment of the invention includes a host 51 (e.g. a computer host), and an expandable optical disk recording and playing device 52. The expandable optical disk recording and playing device 52 includes a (PCI) expanding interface module 527, an expanding interface 528, a storage interface module 525, an output interface module 526, and a CODEC module 522. The (PCI) expanding interface module 527 may include a PCI bus 527a and at least one slot 527b. The expanding interface 528 connects to the slot 527b and the host 51. For instance, the expanding interface 528 of the present embodiment is an expanding USB interface, an expanding IEEE 1394 interface, an expanding network interface such as an RJ-45 connector interface, or the likes. The storage interface module 525 is used for connecting to a storage device 41 such as a hard disk drive or an optical disk drive. If the storage device 41 is an optical disk drive (e.g. a DVD writer), the storage interface module 525 can be a corresponding ATA interface. The output interface module 526 connects with an output device 42. The CODEC module 522 encodes, decodes, or transcodes an A/V source to generate A/V data.

The expanding interface 528 may connect to other external device(s) such as a memory card, a digital camera, a digital video, or a network attached storage (NAS). In addition, the electrical host system 5 may further comprise a microprocessor 523 and a memory module 524, which are cooperate with the CODEC module 522. Thus, the firmware or software codes stored in the memory module 44 and the calculating functions of the microprocessor 43 are employed to encode, decode or transcode the A/V source, so as to generate the required A/V data.

In this embodiment, the A/V source is output from the host 51, passes through the expanding interface 528 and PCI expanding interface module 527 (including the PCI bus 527a and slot 527b), and then arrives the CODEC module 522. After catching the A/V source, the CODEC module 522 can encode, decode or transcode the A/V source to generate A/V data. The generated A/V data can then be output by the output device 42 via the output interface module 526, or be stored in the storage device 41 via the storage interface module 525. For example, the host 51 firstly outputs an A/V source in the format of AVI format, MP3 format, JEPG format or the likes. The A/V source can be a digital A/V bitstream inputted to the CODEC module 522 via the expanding interface 528, the slot 527b, the PCI bus 527a, and the PCI expanding interface module 527. Then, the CODEC module 522 encodes, decodes or transcodes the A/V source. For example, the CODEC module 522 may decode an AVI format file, encode a JEPG format file, or transcode an MP3 format file into a WMA format file. Finally, the A/V data can be output from the output device 42, such as a monitor and a speaker, through the output interface module 526. Thus, the monitor can display the image, and the speaker can output the voice. Besides, the A/V data can be output to the storage device 41, such as a hard disk drive or an optical disk drive, via the storage interface module 525. In this case, if the storage device 41 is a hard disk drive, the A/V data are stored in the hard disk drive directly; otherwise, if the storage device 41 is an optical disk drive, the A/V data can be burned in an optical disk such as a DVD by the optical disk drive.

In the present embodiment, the actions of the expandable optical disk recording and playing device 52 are controlled by the host 51. In addition, the PCI expanding interface module 527, the storage interface module 525, the output interface module 526 and the CODEC module 522 are integrated in a single chip, and the host 51 controls the chip. Accordingly, the host 51 can control the actions of the expandable optical disk recording and playing device 52. Herein, the microprocessor 523 can be an individual chip or chipset separated from a CODEC chip including the CODEC module, and the memory module 524 can be an individual DRAM, SRAM or flash memory separated from the CODEC chip. To be noted, the host 51 may further connect with other devices such as a digital video, or other NAS or database via network. Then, the required information can be input into the expandable optical disk recording and playing device 52 from the digital video, NAS or network database. After being processed by the CODEC module 522, the generated A/V data can then be stored in the storage device 41 or output from the output device 42.

The expandable optical disk recording and playing device 52 may further comprise an input interface module 521, which receives an additional A/V source such as analog A/V signals from an antenna or a video cassette recorder (VCR). The additional A/V source can be encoded, decoded or transcoded by the CODEC module 522 for generating additional A/V data. In this case, the generated additional A/V data can be output from the output device 42 through the output interface module 526, or stored in the storage device 41 through the storage interface module 525. Alternatively, the generated additional A/V data can be transferred to the host 51 via the PCI expanding interface module 527, the PCI bus 527a, the slot 527b, and the expanding interface 528. Then, the host 51 may process the input additional A/V data in proper, for example, to store, play or edit the additional A/V data.

As mentioned above, the CODEC module 522 connects to the input interface module 521, the microprocessor 523, the memory module 524, the storage interface module 525, the output interface module 526 and the PCI expanding interface module 527. In the current embodiment, the above-mentioned modules may connect with one another through a system bus.

In the embodiment, users can install any required periphery interface to expand the expandable optical disk recording and playing device 52 according to the actual situations. Most of all, the embodiment utilizes the PCI interface for the expansion purpose, so that the periphery interface to be expanded to the device 52 can be selectable corresponding to the installed interface of the host 51. Accordingly, the expandable optical disk recording and playing device 52 and the host 51 can communicate with each other perfectly. Similarly, the periphery interface to be expanded to the device 52 can be selectable based on the user's demands.

In summary, since the electrical host system of the invention utilizes a PCI interface to connect the host and the expandable optical disk recording and playing device, the host and the expandable optical disk recording and playing device can properly connect to each other according to actual situations. Accordingly, the expandable optical disk recording and playing device can work independently, or can be controlled by the host by a way of, for example, a remote control. In addition, when the manufacturer presents the expandable optical disk recording and playing device, the periphery interface does not need to be installed in advance, and the customer can expand the required periphery interface according to actual situations. Thus, the cost for the redundant periphery interfaces can be saved, and the actual required periphery interface(s) can be expanded properly, which is convenient for user operations.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electrical host system, comprising:
   a host; and
   an expandable optical disk recording and playing device, which comprises:
   an expanding interface module,
   an expanding interface, which connects to the expanding interface module and is used for connecting to the host,
   a storage interface module, which is used for connecting to a storage device;

an output interface module, and a CODEC module, which encodes, decodes or transcodes an audio/video source to generate audio/video data, wherein the audio/video source is inputted from the host through the expanding interface and the expanding interface module, and the audio/video data are outputted through the output interface module, or through the storage interface module to the storage device, and wherein the expanding interface module is a PCI expanding interface module and comprises a slot and a PCI bus, and the PCI bus connects to the slot and the CODEC module.

2. The electrical host system of claim 1, wherein the action of the expandable optical disk recording and playing device is controlled by the host.

3. The electrical host system of claim 1, wherein the expanding interface module, the storage interface module, the output interface module and the CODEC module are integrated in a single chip controlled by the host.

4. The electrical host system of claim 1, wherein the expandable optical disk recording and playing device further comprises an input interface module.

5. The electrical host system of claim 4, wherein the input interface module receives an additional audio/video source via an antenna or a video cassette recorder (VCR).

6. The electrical host system of claim 1, wherein the expandable optical disk recording and playing device further comprises a microprocessor and a memory module, and the microprocessor and the memory module cooperate with the CODEC module to encode, decode or transcode the audio/video source so as to generate the audio/video data.

7. The electrical host system of claim 1, wherein the expandable interface is an USB interface.

8. The electrical host system of claim 1, wherein the expandable interface is an IEEE 1394 interface.

9. The electrical host system of claim 1, wherein the expandable interface is a network interface.

10. The electrical host system of claim 1, wherein the storage device is a hard disk drive.

11. The electrical host system of claim 1, wherein the storage device is an optical disk drive, and the storage interface module is an ATA interface.

12. The electrical host system of claim 1, wherein the audio/video data are outputted through the output interface module to a monitor and a speaker.

13. The electrical host system of claim 1, wherein the host is a computer host.

* * * * *